US010789214B2

(12) United States Patent
Lu et al.

(10) Patent No.: US 10,789,214 B2
(45) Date of Patent: Sep. 29, 2020

(54) PROVIDING ACCESS TO RESOURCES

(71) Applicant: EMC Corporation, Hopkinton, MA (US)

(72) Inventors: Yifeng Lu, Shanghai (CN); Yuanyang Wu, Shanghai (CN); Brian Tianfang Xiong, Shanghai (CN); Luna Yue Kuang, Shanghai (CN); Alex Minghui Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 525 days.

(21) Appl. No.: 14/970,976

(22) Filed: Dec. 16, 2015

(65) Prior Publication Data

US 2016/0196183 A1 Jul. 7, 2016

(30) Foreign Application Priority Data

Jan. 4, 2015 (CN) .......................... 2015 1 0004779

(51) Int. Cl.
*G06F 16/178* (2019.01)
*G06F 11/20* (2006.01)

(52) U.S. Cl.
CPC ...... *G06F 16/1794* (2019.01); *G06F 11/2069* (2013.01); *G06F 11/2071* (2013.01)

(58) Field of Classification Search
CPC ........... G06F 17/30179; G06F 11/2069; G06F 11/2071; G06F 16/1794
USPC .......................................................... 707/610
See application file for complete search history.

(56) References Cited

U.S. PATENT DOCUMENTS 5,893,919 A 4/1999 Sarkozy et al.
7,281,032 B2 10/2007 Kodama
8,155,118 B2 4/2012 Jorgensen et al.
8,527,471 B2 9/2013 Hoprich et al.
9,811,431 B1 * 11/2017 Natanzon ................ G06F 16/27
2006/0218207 A1 * 9/2006 Nonaka ............... G06F 16/1794
2010/0036931 A1 * 2/2010 Certain ............... G06F 11/1451 709/214
2013/0282658 A1 * 10/2013 Besen ................. G06F 16/1794 707/634
2014/0195480 A1 * 7/2014 Talagala ............. G06F 12/0804 707/610
2014/0201142 A1 * 7/2014 Varadharajan .......... G06F 16/23 707/622
2015/0310188 A1 * 10/2015 Ford ....................... G06F 21/10 726/28

FOREIGN PATENT DOCUMENTS

CN 101201765 A1 6/2008
CN 101916293 A 12/2010
CN 103544081 A1 1/2014

* cited by examiner

*Primary Examiner* — Hosain T Alam
*Assistant Examiner* — Saba Ahmed
(74) *Attorney, Agent, or Firm* — BainwoodHuang

(57) ABSTRACT

Embodiments of the present disclosure provide a computer program product, a system and a method for providing access to storage resources by receiving a user selection of one or more of a plurality of source storage resources; establishing corresponding backup storage resources for the selected one or more source storage resources.

10 Claims, 4 Drawing Sheets

200

201 201'

202 202'

203 204 205 203' 204' 205'

206 207 208

PROVIDING ACCESS TO RESOURCES

RELATED APPLICATION

This application claim priority from Chinese Patent Application Number CN201510004779.9, filed on Jan. 4, 2015 at the State Intellectual Property Office, China, titled "METHOD AND SYSTEM FOR PROVIDING ACCESS TO RESOURCES," the contents of which is herein incorporated by reference in entirety.

FIELD OF THE INVENTION

Embodiments of the present disclosure relate to the field of disaster recovery.

BACKGROUND OF THE INVENTION

As computer technology has developed rapidly, storage technology gradually has become one of focuses of research. An important issue confronting the field of storage may be related to performing disaster recovery for resources. Generally, the term "disaster recovery" involves that when a system may malfunction or power down, and therefore it cannot provide services, the system may switch to a backup storage system which will take over the corresponding function to provide services.

However, in conventional disaster recovery, stored resources may be recovered in coarse granularity, i.e., a whole recovery may need to be performed for all stored resources of the storage system that suffers from the disaster. On the one hand, such disaster recovery may be inflexible, consuming longer time periods (e.g., over 10 minutes) for recovery, and may be hard to keep the whole recovery procedure transparent to a user. On the other hand, dedicated storage areas or resources may need to be individually reserved for it in the backup storage system, and these dedicated storage areas or resources may not provide other services and thereby cause a waste of resources.

SUMMARY OF THE INVENTION

Example embodiments of the present disclosure provide a system, a computer program product and a method of providing an access to storage resources by receiving a user selection of one or more of a plurality of source storage resources; establishing corresponding backup storage resources for the selected one or more source storage resources.

BRIEF DESCRIPTION OF THE ACCOMPANYING DRAWINGS

The above-mentioned and other objects, features and advantages of the present disclosure will be more apparent by describing exemplary embodiments of the present disclosure in more detail with reference to figures, wherein identical reference numbers represent identical component in the exemplary embodiments of the present disclosure.

DETAILED DESCRIPTION

Figure 1:
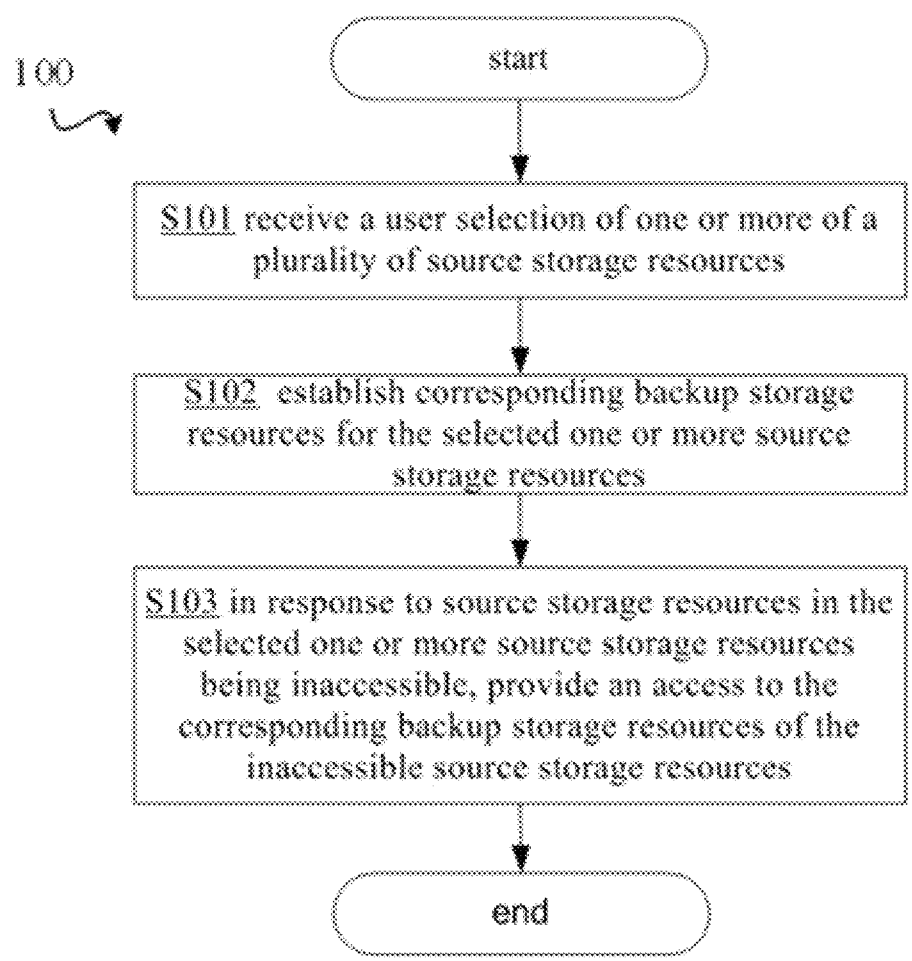
FIG. 1 illustrates a flowchart of a method 100 for providing an access to storage resources according to an exemplary embodiment of the present disclosure.

Embodiments of the present disclosure will be described in more detail with reference to the figures. Although the figures show embodiments of the present disclosure, it should be appreciated that the present disclosure may be implemented in various forms and should not be limited by embodiments described here. On the contrary, these embodiments are provided to make the present disclosure more through and complete and convey the scope of the present disclosure completely to those skilled in the art.

Embodiments of the present disclosure provide a system, a computer program product and a method of providing an access to storage resources by receiving a user selection of one or more of a plurality of source storage resources; establishing corresponding backup storage resources for the selected one or more source storage resources. A further embodiment may include in response to source storage resources in a selected one or more source storage resources being inaccessible, providing an access to a corresponding backup storage resources of a inaccessible source storage resources. An optional embodiment may include establishing metadata backup for metadata for a plurality of source storage resources.

An optional embodiment may include providing an access to corresponding backup storage resources of inaccessible source storage resources by acquiring a metadata backup for inaccessible source storage resources. A further embodiment may include providing access based on an acquired metadata backup and backup storage resources of inaccessible source storage resources.

An optional embodiment may include converting a format of an acquired metadata backup into a text format, A further embodiment may include converting metadata into a text format to metadata in a target format. A further embodiment may include providing access based on a metadata in a target format and backup storage resources of inaccessible source storage resources. An optional embodiment may include not establishing backup storage resources for source storage resources of a plurality of source storage resources not selected by the user. An optional embodiment may include, source storage resources and backup storage resources being located at different sites. An optional embodiment may include, storage resources being a file system.

A further embodiment may provide a system of providing an access to storage resources. A further embodiment may include, a receiving unit configured to receive a user selection of one or more of a plurality of source storage resources. A further embodiment may include an establishing unit configured to establish corresponding backup storage resources for a selected one or more source storage resources. A further embodiment may include a resource access providing unit configured to, in response to source storage resources in a selected one or more source storage resources being inaccessible, provide an access to a corresponding backup storage resources of inaccessible source storage resources.

An optional embodiment may include a metadata backup unit configured to establish metadata backup for metadata for a plurality of source storage resources. In optional embodiment the resource access providing unit may be further configured to acquire the metadata backup for inaccessible source storage resources and provide access based on acquired metadata backup and backup storage resources of inaccessible source storage resources.

An optional embodiment may include converting a format of an acquired metadata backup into a text format. A further embodiment may include converting a metadata in a text format into metadata in a target format. A further embodiment may include providing access based on a metadata in a target format and a backup storage resources of inaccessible source storage resources.

In an optional embodiment, the establishing unit may be further configured not to establish backup storage resources for source storage resources of a plurality of source storage resources not selected by a user. In an optional embodiment, source storage resources and backup storage resources may be located at different sites. In an optional embodiment, storage resources may be a file system.

In one embodiment, there may be provided a computer program product, comprising computer readable program instructions embodied therein, the computer readable program instructions when executed by a processing unit, perform the method of present disclosure disclosed above.

An advantage embodiment according to the present disclosure may save resources and perform disaster recovery quickly and flexibly upon occurrence of a disaster, and keep transparency to a user during the entire process.

FIG. 1 illustrates a flowchart of a method 100 for providing an access to storage resources according to an exemplary embodiment of the present disclosure. It should be noted that the storage resources herein may comprise various types of storage resources, and typically may comprise a file system. However, the present disclosure is not limited to this, i.e., any other types of storage resources all fall within the concept of the present disclosure.

As shown in FIG. 1, after the method 100 starts, it proceeds to step S101 of receiving a user selection of one or more of a plurality of source storage resources. Step S101 makes it possible to treat the storage resources that are interesting or relatively important for the user differently while backing up the source storage resources. Then, the method 100 proceeds to step S102 of establishing corresponding backup storage resource for the selected one or more source storage resources. Then, the method 100 proceeds to step S103 of, in response to the source storage resources in the selected one or more source storage resources being inaccessible, providing an access to the corresponding backup storage resources of the inaccessible source storage resources.

In some embodiment, it may be noted the term “source storage resource” used here may be relative to “backup storage resource” mentioned later, and the “source storage resource” may mainly refers to a resource originally used to provide an access for a user. In one embodiment, in practice, a source storage resource may be stored in the form for example of a LUN (Logical Unit Number). In some other embodiment, those skilled in the art may appreciate that the importance of storage resources usually varies for a user. In some other embodiments, sometimes, a user might be only interested in a part of storage resources and seldom utilize remaining storage resources.

In an exemplary embodiment of the present disclosure, source storage resources and backup storage resources may be located at different sites, e.g., a source site and a target site. In an example embodiment, backup storage resources may be established by mirroring one or more source storage resources at a source site to a target site. In a further embodiment, when a disaster occurs at source storage resources at a source site, it may be possible that the access to resources will be provided via backup storage resources stored in a target site. In a further embodiment, in practice, real-time synchronous updating may be generally used to keep backup storage resources consistent with source storage resources to the extent possible. In a further embodiment, once an operation such as reading, writing or updating may be performed for selected source storage resources, a similar operation may be performed for backup storage resources in a real-time and synchronous manner.

In a further embodiment, those skilled in the art may appreciate that, since backup has been established for source storage resources, access to source storage resources may be provided based on a corresponding backup storage resources. Those skilled in the art may appreciate that in some exemplary embodiments of the present disclosure, backup may not be established for those source storage resources of a plurality of source storage resources not selected by a user to further save resources.

According to an exemplary embodiment of the present disclosure, method 100 may further selectively comprise a step of establishing metadata backup for a metadata for a plurality of source storage resources. In a further embodiment, the term “metadata”, as description information for backup resources, may comprise storage volume structure, configuration information of user access authority and the like in the context. In an implementation embodiment, metadata may be stored in a form of a specific storage unit such as control LUN. In a further embodiment, it may be noted that for the implementation purpose, the step of establishing backup for metadata may be performed at any possible timing of method 100. In an example embodiment, it may be performed before or after step S101, but the present disclosure may not be limited to this. In a further embodiment, when a disaster occurs and some source storage resources may become inaccessible, an exemplary implementation may perform step (1) of acquiring a metadata backup for inaccessible source storage resources; and step (2) of providing access to backup storage resources corresponding to inaccessible source storage resources based on an acquired metadata backup and backup storage resources of inaccessible source storage resources.

According to a further exemplary embodiment of the present disclosure, the step (2) of basing on an acquired metadata backup and backup storage resources of inaccessible source storage resources may be implemented by the following steps:

(2-1) converting a format of an acquired metadata backup into a text format, e.g., a plain text format. As a text format is independent of a platform, and thus conversion of a metadata between different formats may be quickly achieved by a text format as a medium, which is easily operable.

(2-2) converting metadata in a text format into metadata in a target format. It should be appreciated that in the case that source storage resources and backup storage resources may be located at different sites, a target format may be a metadata format supported by a target site according to an exemplary embodiment of the present disclosure.

(2-3) providing access based on a metadata of a target format and backup storage resources of inaccessible source storage resources. Since a metadata and storage resources are all available at a target site at this time, a corresponding service may be provided to a user based on both of them.

As can be seen from the embodiments above, generally, method 100 performs backup only for resources selected by a user so that less time may be consumed during disaster recovery, and the operation may become more flexible. In an additional embodiment, a dedicated storage area need not be allocated for backup resources at a target site where backup resources may be located, which facilitates a reduction in waste of resources.

Figure 2:
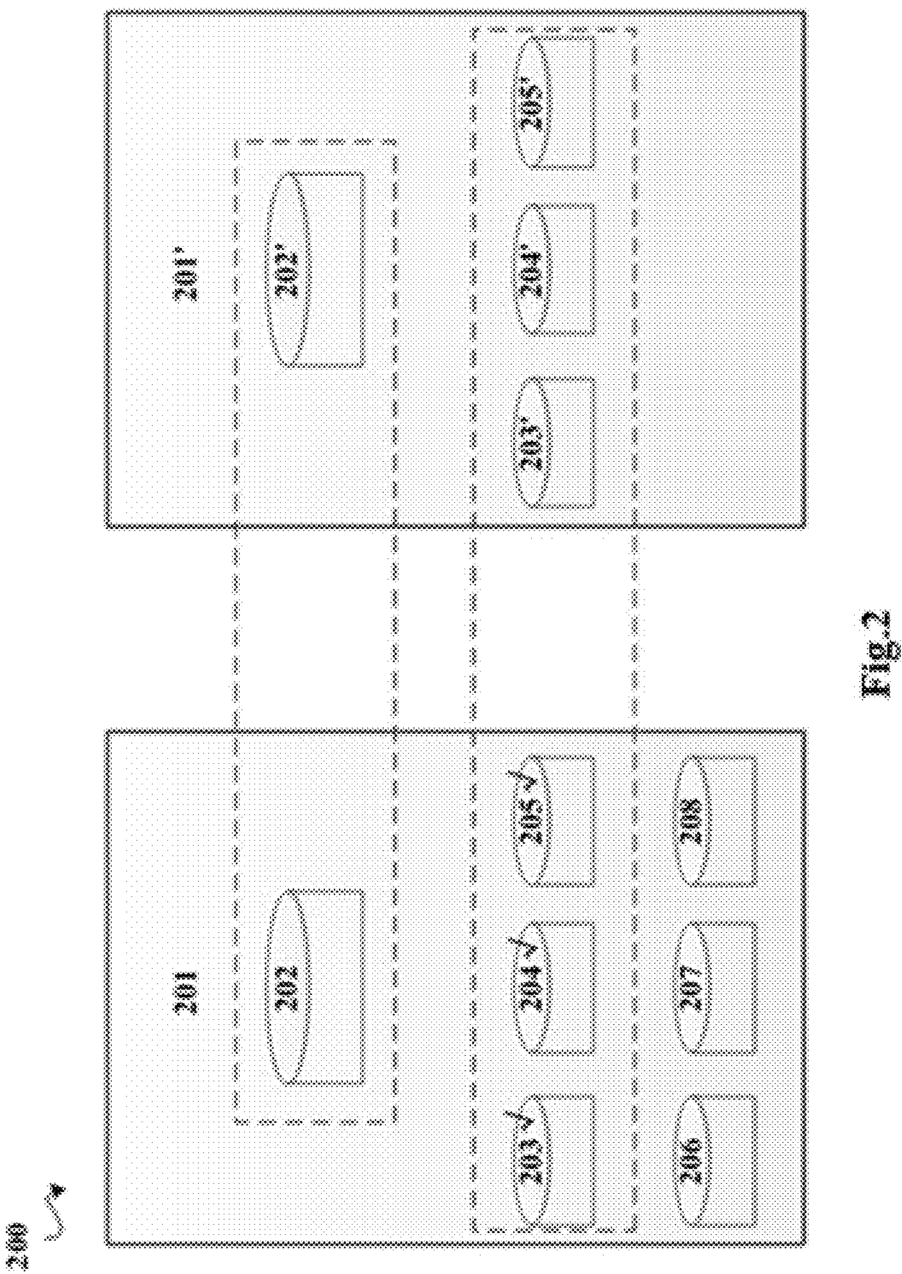
FIG. 2 illustrates one example 200 for providing an access to storage resources according to an exemplary embodiment of the present disclosure.

FIG. 2 illustrates example 200 for providing an access to storage resources according to an exemplary embodiment of the present disclosure. Those skilled in the art should appreciate that example 200 is presented only for illustrative purpose, it might cover a more detailed embodiment, but it cannot be regarded as limiting aspects of the present disclosure.

As shown in FIG. 2, source storage resources 203-208 are stored in source site 201 for example in the form of LUN, and meanwhile corresponding metadata 202 are also stored in source site 201.

To perform backup for the resources for use in disaster recovery, metadata 202 may be first mirrored to target site 201' during initialization process to form backup metadata 202'. Typically, source site 201 and target site 201' are different sites.

Then, during configuration process, if a user is only interested in resources 203-205 among source storage resources 203-208, the user may only select source storage resources 203-205 for backup. As shown in FIG. 2, backup is performed only for source storage resources 203-205 selected by the user on target site 201' to form backup source storage resources 203'-205', and no backup is performed for source storage resources 206-208 that are not selected by the user.

When the disaster occurs, e.g., when source storage resource 203 is inaccessible, it is feasible to first acquire backup metadata 202' on target site 201' to convert it into a plain text format, then convert it into a metadata format supported by target site 201' and incorporate it into the metadata of target site 201'. In this way, the service originally provided by 203 may be provided based on the backup metadata and backup storage resource 203'.

Figure 3:
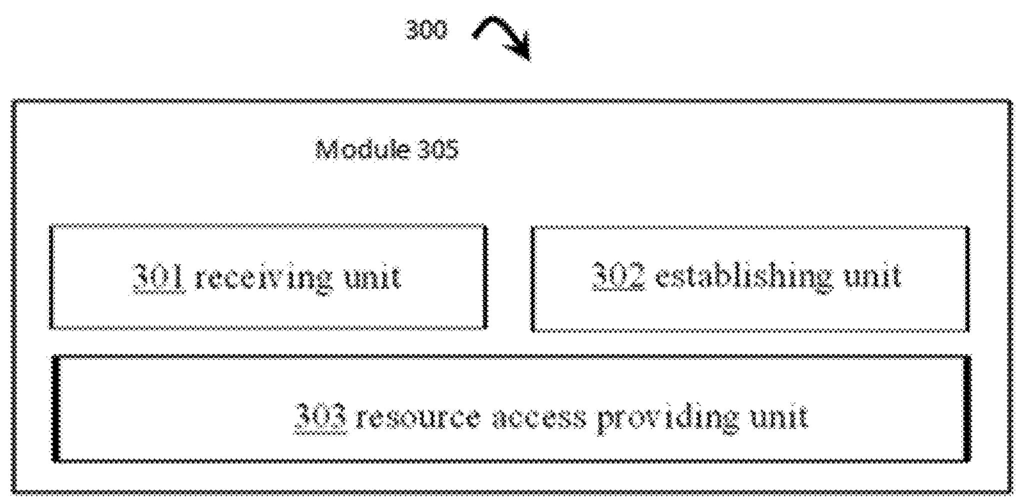
FIG. 3 illustrates a system 300 for providing an access to storage resources according to an exemplary embodiment of the present disclosure.

Next, reference is made to system 300 for providing an access to storage resources according to an exemplary embodiment of the present disclosure as depicted in FIG. 3. As shown in FIG. 3, system 300 comprises receiving unit 301, establishing unit 302 and resource access providing unit 303. Receiving unit 301 is configured to receive a user selection of one or more of a plurality of source storage resources. Establishing unit 302 is configured to establish corresponding backup storage resources for the selected one or more source storage resources. Resource access providing unit 303 is configured to, in response to the source storage resources in the selected one or more source storage resources being inaccessible, provide an access to the corresponding backup storage resources of the inaccessible source storage resources.

In an optional embodiment of the present disclosure, system 300 may include a metadata backup unit configured to establish metadata backup for the metadata for a plurality of source storage resources.

In an optional embodiment of the present disclosure, resource access providing unit 303 may be further configured to acquire a metadata backup for inaccessible source storage resources and provide access based on acquired metadata backup and backup storage resources of inaccessible source storage resources.

In an optional embodiment, providing access based on acquired metadata backup and backup storage resources of inaccessible source storage resources may include converting a format of acquired metadata backup into a text format. A further embodiment may include converting a metadata in a text format to metadata into a target format. A further embodiment may include providing access based on a metadata in a target format and a backup storage resources of inaccessible source storage resources.

In an optional embodiment, establishing unit 302 may be further configured not to establish backup storage resources for source storage resources of a plurality of source storage resources not selected by the user. In an optional embodiment, source storage resources and backup storage resources may be located at different sites. In an optional embodiment, storage resources may be a file system. In an alternate embodiment, a module may replace all units and perform the tasks of each of these units disclosed above.

Figure 4:
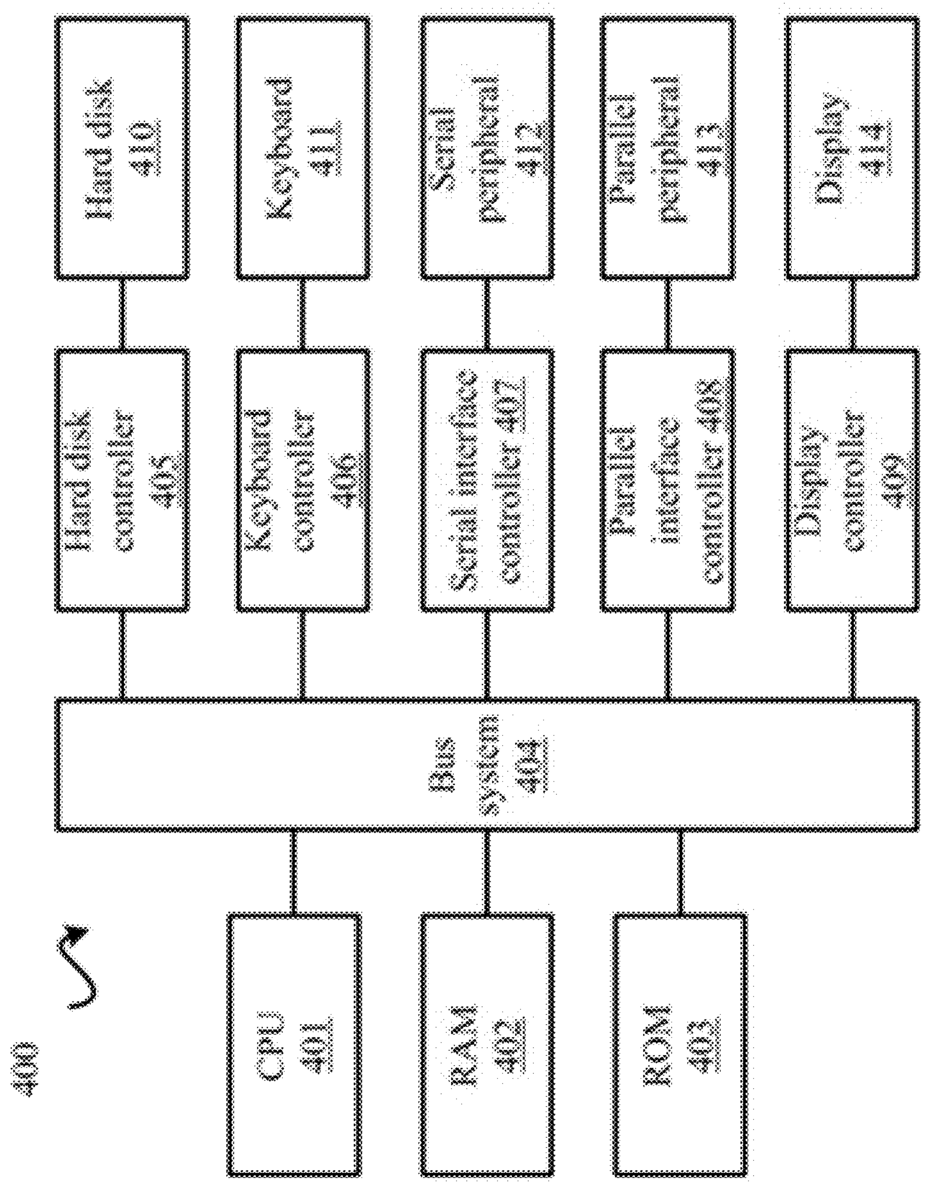
FIG. 4 illustrates a schematic block diagram of a computer system 400 for implementing embodiments of the present disclosure.

Reference is now made to FIG. 4 which illustrates a schematic block diagram of computer system 400 used to implement an embodiment of the present disclosure. For example, computer system 400 shown in FIG. 4 may be used to implement components of system 300 for providing access to storage resources as depicted above, and also used to solidify or implement each step of method 100 for providing the access to storage resources as depicted above.

As shown in FIG. 4, computer system 400 as shown in the figure may include CPU (Central Processing Unit) 401, RAM (Random Access Memory) 402, ROM (Read Only Memory) 403, system bus 404, hard disk controller 405, keyboard controller 406, serial interface controller 407, parallel interface controller 408, display controller 409, hard disk 410, keyboard 411, serial peripheral device 412, parallel peripheral device 413 and display 414. Among these components, components coupled to system bus 404 are CPU 401, RAM 402, the ROM 403, hard disk controller 405, keyboard controller 406, serial interface controller 407, parallel interface controller 408 and display controller 409. Hard disk 410 is coupled to hard disk controller 405; keyboard 411 is coupled to keyboard controller 406; serial peripheral device 412 is coupled to serial interface controller 407; parallel peripheral device 413 is coupled to parallel interface controller 408; and display 414 is coupled to display controller 409. It should be understood that the structural block diagram in FIG. 4 is shown only for illustration purpose, and is not intended to limit the scope of the present disclosure. In some cases, some devices may be added or removed, which depends on specific situations.

As stated above, system 300 may be implemented as a hardware, e.g., a chip, ASIC, SOC or the like. This hardware may be integrated in computer system 400. Besides, embodiments of the present disclosure may be implemented in the manner of a computer program product. For example, method 100 as described with reference to FIG. 1 may be implemented by a computer program product. This computer program product may be stored in RAM 402, ROM 403, hard disk 410 as illustrated in FIG. 4 and/or any suitable storage medium, or downloaded to the computer system 400 from a suitable location in the network. The computer program product may comprise a computer code portion comprising program instructions executed by a suitable processing device (for example, CPU 401 in FIG. 4). The program instructions may at least comprise instructions for implementing steps of method 100. These program instructions may at least comprise an instruction for receiving a user selection of one or more of a plurality of source storage resources, and an instruction for establishing corresponding backup storage resource for the selected one or more source storage resources. These program instructions further comprise an instruction for, in response to the source storage resources in the selected one or more source storage resources being inaccessible, providing an access to the corresponding backup storage resources of the inaccessible source storage resources.

The preceding text has already illustrated the spirit and principles of the present disclosure in conjunction with several embodiments. The method and system for providing the access to storage resources according to the present disclosure have many advantages over the prior art. For example, the present disclosure supports fine-granularity resource backup by providing a suitable method and system. Embodiments provided by the present disclosure may save resources and perform disaster recovery quickly and flexibly upon occurrence of the disaster, and keep transparency to the user during the whole procedure.

It should be noted that, embodiments of the present disclosure may be implemented in software, hardware or the combination thereof. The hardware part may be implemented by a special logic; the software part may be stored in a memory and executed by a proper instruction execution system such as a microprocessor or a design-specific hardware. Those skilled in the art may understand that the above method and system may be implemented by a computer-executable instruction and/or in a processor controlled code, for example, such code may be provided on a carrier medium such as a magnetic disk, CD, or DVD-ROM, or a programmable memory such as a read-only memory (firmware) or a data carrier such as an optical or electronic signal carrier. The apparatuses and their modules in the present disclosure may be implemented by a very large scale integrated circuit or gate array, a semiconductor such as logical chip or transistor, or hardware circuitry of a programmable hardware device such as a field-programmable gate array, or a programmable logical device, or implemented by software executed by various kinds of processors, or implemented by combination of the above hardware circuitry and software, such as firmware.

It should be noted that although a plurality of means or sub-means of the device have been mentioned in the above detailed depiction, such partitioning is merely non-compulsory. In actuality, the features and functions of the above described two or more means may be embodied in one means according to the embodiments of the present disclosure. In turn, the features and functions of the above described one means may be further embodied in more means.

Besides, although operations of the present method are described in a particular order in the drawings, it does not require or imply that these operations must be performed according to this particular sequence, or a desired outcome can only be achieved by performing all shown operations. On the contrary, the execution order for the steps as depicted in the flowcharts may be changed. Additionally or alternatively, some steps may be omitted, a plurality of steps may be merged into one step, and/or one step may be divided into a plurality of steps for execution.

Although the present disclosure has been depicted with reference to a plurality of embodiments, it should be understood that the present disclosure is not limited to the disclosed embodiments. The present disclosure intends to cover various modifications and equivalent arrangements included in the spirit and scope of the appended claims. The scope of the appended claims meets the broadest explanations and covers all such modifications and equivalent structures and functions.

What is claimed is:

1. A method of providing access to storage resources, including one or more processors and memory, the method comprising:

receiving a user selection of one or more of a plurality of source storage resources at a source site, wherein the plurality of source storage resources include a file system stored in at least one logical unit;

in response to the user selection of the one or more source storage resources, and while the one or more source storage resources are accessible, establishing corresponding backup storage resources, at a target site, for the selected one or more source storage resources, at least in part by mirroring only the selected one or more source storage resources at the source site to the corresponding backup storage resources at the target site, wherein once operations are performed on the selected one or more source resources similar operations are performed on the corresponding backup storage resources in a real-time and synchronous manner;

in response to source storage resources in the selected one or more source storage resources being inaccessible, providing access to the corresponding backup storage resources, at the target site, of the inaccessible source storage resources, from the source site;

establishing metadata backup for metadata of the plurality of source storage resources at least in part by establishing backup for metadata that is stored in a control logical unit;

wherein providing access to the corresponding backup storage resources of the inaccessible source storage resources includes acquiring the metadata backup for the inaccessible source storage resources and providing access to the corresponding backup storage resources of the inaccessible source storage resources at the target site from the source site based on the acquired metadata backup and the backup storage resources of the inaccessible source storage resources; and wherein providing the access based on the acquired metadata backup and the backup storage resources of the inaccessible source storage resources further comprises:

converting a format of the acquired metadata backup into a text format;

converting the metadata in the text format into metadata in a target format; and providing access based on the metadata in the target format and the backup storage resources of the inaccessible source storage resources.

2. The method according to claim 1, further comprising:

not establishing backup storage resources for source storage resources of the plurality of source storage resources not selected by the user.

3. The method according to claim 1, wherein the source storage resources and the backup storage resources are located at different sites.

4. A system of providing access to storage resources, including one or more processors and memory, comprising a module configured to:

receive a user selection of one or more of a plurality of source storage resources at a source site, wherein the plurality of source storage resources include a file system stored in at least one logical unit;

responsive to the user selection of the one or more source storage resources, and while the one or more source storage resources are accessible, establish corresponding backup storage resources at a target site, for the selected one or more source storage resources, at least in part by causing only the selected one or more source storage resources at the source site to be mirrored to the corresponding backup storage resources at the target site, wherein once operations are performed on the selected one or more source resources similar operations are performed on the corresponding backup storage resources in a real-time and synchronous manner;

in response to source storage resources in the selected one or more source storage resources being inaccessible, provide access to the corresponding backup storage resources, at the target site, of the inaccessible source storage resources, from the source site;

establish metadata backup for metadata of the plurality of source storage resources at least in part by establishing backup for metadata that is stored in a control logical unit;

wherein access is provided to the corresponding backup storage resources of the inaccessible source storage resources at least in part by acquiring the metadata backup for the inaccessible source storage resources and providing access to the corresponding backup storage resources of the inaccessible source storage resources at the target site from the source site based on the acquired metadata backup and the backup storage resources of the inaccessible source storage resources; and wherein the module is further configured to:

convert a format of the acquired metadata backup into a text format;

convert the metadata in the text format into metadata in a target format; and provide access based on the metadata in the target format and the backup storage resources of the inaccessible source storage resources.

5. The system according to claim 4, wherein the module is further configured not to establish backup storage resources for source storage resources of the plurality of source storage resources not selected by the user.

6. The system according to claim 4, wherein the source storage resources and the backup storage resources are located at different sites.

7. A computer program product, comprising computer readable program instructions embodied therein, the computer readable program instructions when executed by a processing unit, perform the method of providing access to storage resources, including one or more processors and memory, comprising:

receiving a user selection of one or more of a plurality of source storage resources, at a source site, wherein the plurality of source storage resources include a file system stored in at least one logical unit;

in response to the user selection of the one or more source storage resources, and while the one or more source storage resources are accessible, establishing corresponding backup storage resources, at a target site, for the selected one or more source storage resources, at least in part by mirroring only the selected one or more source storage resources at the source site to the corresponding backup storage resources at the target site, wherein once operations are performed on the selected one or more source resources similar operations are performed on the corresponding backup storage resources in a real-time and synchronous manner;

in response to source storage resources in the selected one or more source storage resources being inaccessible, providing access to the corresponding backup storage resources, at a target site, of the inaccessible source storage resources, from the source site;

establishing metadata backup for metadata of the plurality of source storage resources at least in part by establishing backup for metadata that is stored in a control logical unit;

wherein providing access to the corresponding backup storage resources of the inaccessible source storage resources includes acquiring the metadata backup for the inaccessible source storage resources and providing access to the corresponding backup storage resources of the inaccessible source storage resources at the target site from the source site based on the acquired metadata backup and the backup storage resources of the inaccessible source storage resources; and wherein providing the access based on the acquired metadata backup and the backup storage resources of the inaccessible source storage resources further comprises:

converting a format of the acquired metadata backup into a text format;

converting the metadata in the text format into metadata in a target format; and providing access based on the metadata in the target format and the backup storage resources of the inaccessible source storage resources.

8. The computer program product according to claim 7, further comprising:

not establishing backup storage resources for source storage resources of the plurality of source storage resources not selected by the user.

9. The computer program product according to claim 7, wherein the source storage resources and the backup storage resources are located at different sites.

10. The method according to claim 1, wherein establishing metadata backup for metadata of the plurality of source storage resources includes establishing backup for metadata that includes user access information.

* * * * *